(12) United States Patent
Leistner

(10) Patent No.: US 7,726,925 B2
(45) Date of Patent: Jun. 1, 2010

(54) FASTENER WITH PRONGS

(75) Inventor: Martin Leistner, Toronto (CA)

(73) Assignee: Falcon Fasteners Reg'd, Toronto, Scarborough (CA)

(*) Notice: Subject to any disclaimer, the term of this patent is extended or adjusted under 35 U.S.C. 154(b) by 529 days.

(21) Appl. No.: 11/187,948

(22) Filed: Jul. 25, 2005

(65) Prior Publication Data

US 2007/0020062 A1   Jan. 25, 2007

(51) Int. Cl.
F16B 37/04 (2006.01)
(52) U.S. Cl. .................. 411/179; 411/187; 411/466
(58) Field of Classification Search ......... 411/179–181, 411/187, 176, 466
See application file for complete search history.

(56) References Cited

U.S. PATENT DOCUMENTS

| | | | |
|---|---|---|---|
| 1,979,686 A | 11/1934 | Hall et al. | |
| 2,102,558 A * | 12/1937 | Johnson | 411/177 |
| 3,270,610 A * | 9/1966 | Knowlton | 411/427 |
| 3,480,061 A | 11/1969 | Leistner | |
| 4,508,478 A | 4/1985 | Leistner | |
| 4,543,763 A * | 10/1985 | Ernst et al. | 52/698 |
| 5,071,299 A | 12/1991 | Sekine et al. | |
| 5,214,843 A | 6/1993 | Bromley et al. | |
| 5,288,244 A | 2/1994 | Lien | |
| 5,327,645 A | 7/1994 | Bromley et al. | |
| 5,348,432 A | 9/1994 | Nagayama | |
| 5,429,466 A | 7/1995 | Nagayama | |
| 5,501,558 A * | 3/1996 | Figge et al. | 411/176 |
| 5,560,099 A | 10/1996 | Leistner et al. | |
| 5,863,164 A | 1/1999 | Leistner | |
| 6,109,849 A | 8/2000 | Nagayama | |
| 6,637,994 B2 | 10/2003 | Leistner | |
| 6,817,079 B2 | 11/2004 | Leistner et al. | |

* cited by examiner

Primary Examiner—Flemming Saether
(74) Attorney, Agent, or Firm—Birch, Stewart, Kolasch & Birch, LLP

(57) ABSTRACT

A fastener with a flange having two pairs of parallel sides and arcuate corners. Extending upwardly from the top surface of the flange is an elongated shaft having one region adjacent the flange having relatively thicker threaded walls and another distal from the flange having thinner unthreaded walls. Two prongs are formed by making cuts in opposing straight sides adjacent to the diagonally opposing arcuate corners, and then bending peripheral portions of the flange including the arcuate corners adjacent to the cuts in a direction upwardly by substantially 90°. The depth of the cuts is such that when bends are made, the perpendicular distance between front surfaces of the two prongs is less than an outer diameter of the shaft. When the fastener is inserted in a piece of material, the prongs dig into the surface of the material to prevent the fastener from rotating when a threaded fastener is screwed into the shaft.

28 Claims, 6 Drawing Sheets

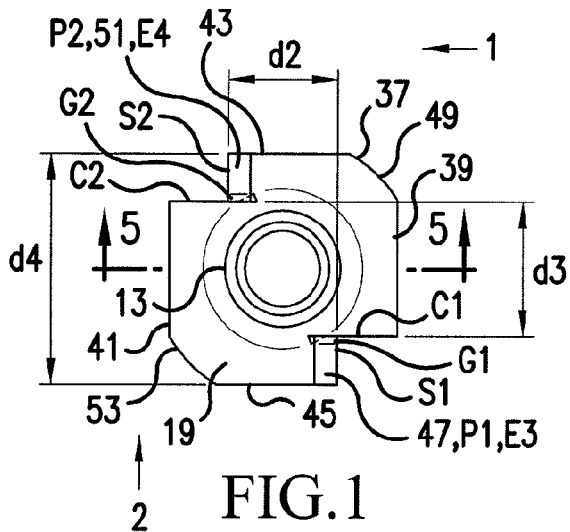
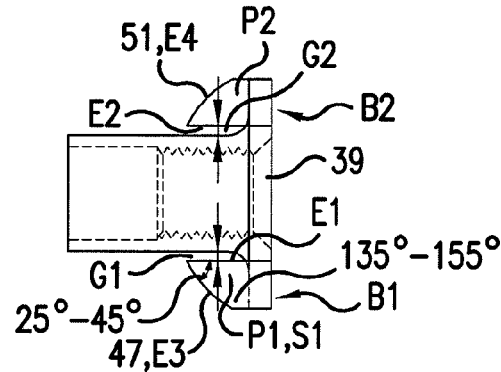
FIG.1          FIG.2
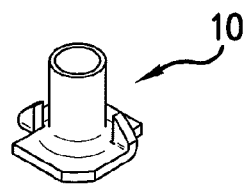
FIG.3
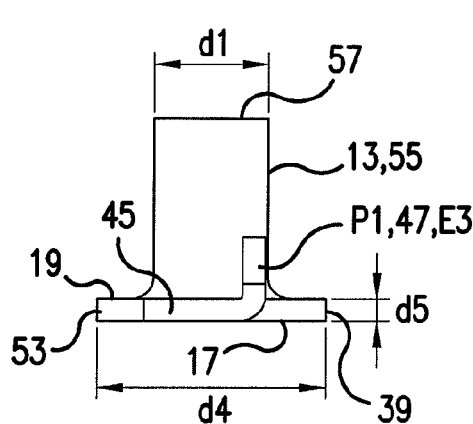
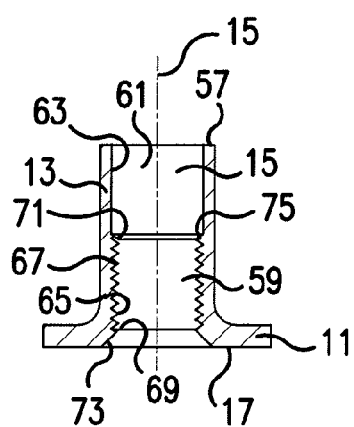
FIG.4          FIG.5

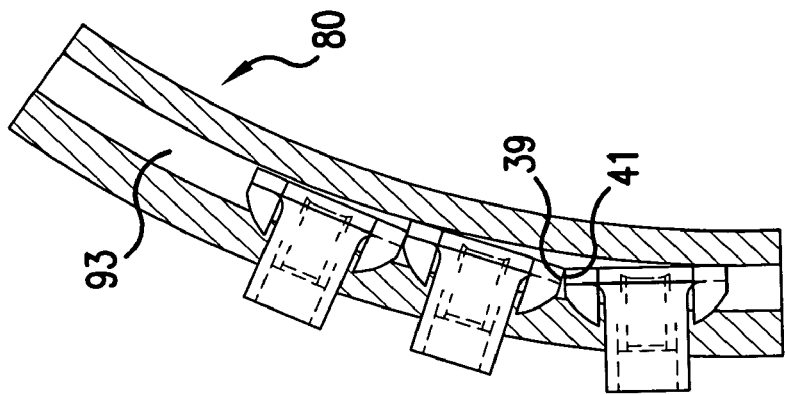
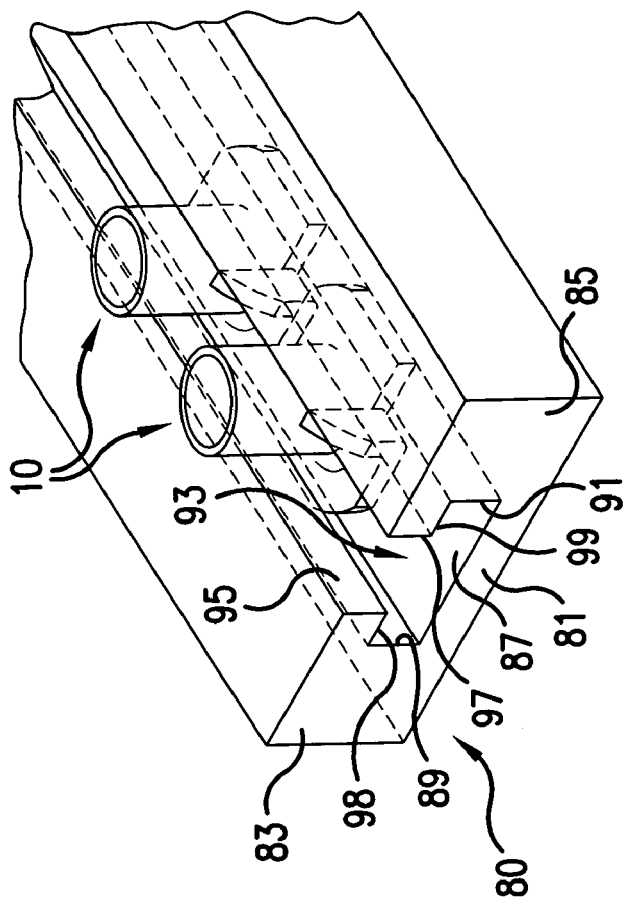

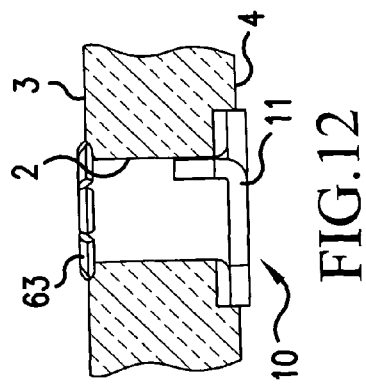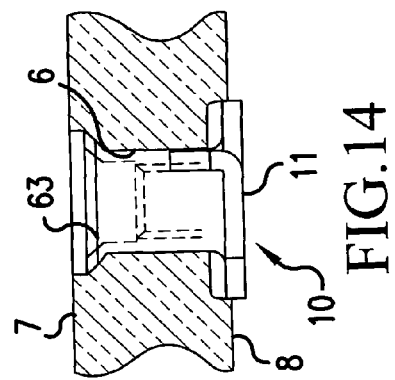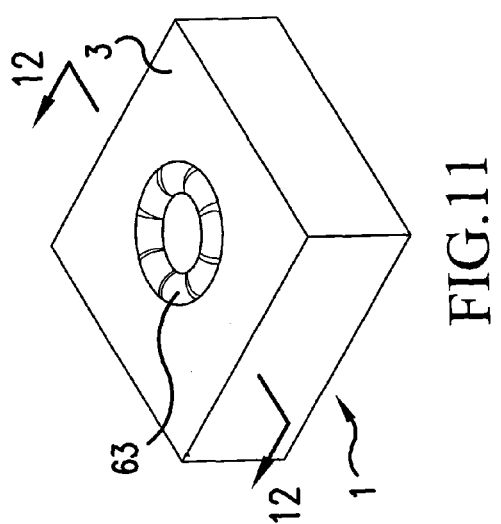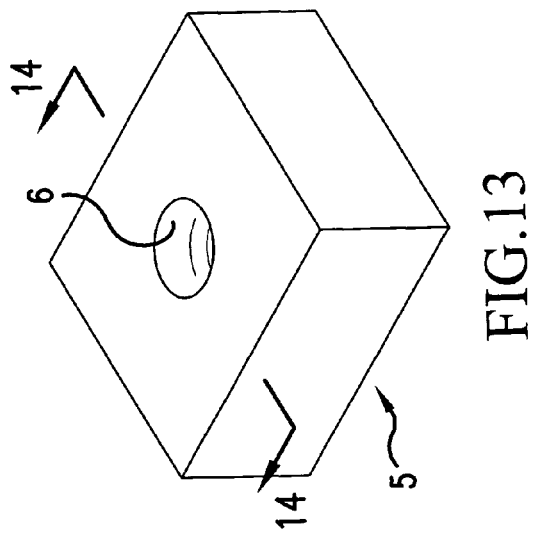

FASTENER WITH PRONGS

BACKGROUND OF THE INVENTION

1. Field of the Invention

The present invention relates to a fastener. When the fastener is inserted in a piece of material, at least one prong digs into the surface of the material to prevent the fastener from rotating when a threaded fastener is screwed into the fastener.

2. Description of Background Art

Fasteners including a flange with a shaft extending therefrom are well known. It is also well known to provide the shaft with an end remote from the flange having a reduced wall thickness to facilitate riveting that end over the surface of a piece of material through which the shaft has been inserted to hold the fastener against axial movement once riveted. Rivets may also prevent rotation of the fastener, particularly rivets which have alternating flaired and non-flaired portions.

However, riveting fasteners, which would be desirable to prevent rotation of the fasteners, is difficult in several situations, including the following:

1. Tapered holes. In the manufacture of office seating, the curved plywood pieces that make up the backs of the seats are sometimes punched out of a formed blank with a knife edge die. For forms with a simple curvature, this is faster than using a router to cut out the piece, and in addition the holes for the fasteners can be punched at the same time, saving the time and cost of the secondary drilling operation. However, punched holes are tapered. When using conventional riveting methods, it is difficult to ensure that there is sufficient penetration into the sides of the hole to prevent rotation when the hole is opening up.

2. Varying material thickness. Components made from plywood have a consistent thickness throughout. However components that are molded from plastic or a wood sawdust/resin mixture generally are thinner in some areas and thicker in others. This leads to different depths of holes into which the fasteners are inserted. It is very difficult to ensure consistently good riveting into different depth holes with a single set-up.

In view of the problems described above, a need has developed for a fastener that may be 1) guided within the track by the sides of the fastener; 2) more firmly secured to the surface of the material to prevent the fastener from rotating, particularly for fasteners that are not riveted; and 3) prevented from shingling solely by the thickness of the straight sides of the fastener. Furthermore, a need has developed for a fastener wherein the fastener blank is formed in a forging operation with the fastener blank being subsequently tapped. It is with these needs in mind that the present invention was developed.

SUMMARY OF THE INVENTION

The present invention relates to a fastener (tee-nut).

The fastener (tee-nut) of some embodiments the present invention includes the following interrelated features: a flange and a shaft, said shaft extending upwardly from said flange, and including an opening aligned with said shaft, the opening being remote from said flange, said flange having a substantially rectangular periphery including four straight sides, the four straight sides being a first straight side, a second straight side, a third straight side and a fourth straight side, the first and the third straight sides being parallel to each other. The periphery of the flange also includes: a first arcuate side connecting the first straight side and the second straight side; a second arcuate side connecting the second straight and the third straight side; and a third arcuate side connecting the third straight side and the fourth straight side; a fourth arcuate side connecting the fourth straight side and the first straight side; a first cut in the second straight side being formed adjacent to the second arcuate side; and a first prong formed by bending peripheral portions of the flange including at least the second arcuate side in a direction upwardly from the second straight side by substantially 90°, whereby front and back surfaces of the first prong are oriented in a direction substantially perpendicular to a top surface of the flange.

In addition, the fastener according to some embodiments of the present invention includes a thickness $d_5$ of the flange that is equal to at least 8% of a perpendicular distance $d_4$ between opposite straight sides of the flange.

According to some embodiments of the present invention, when the fastener is inserted into a piece of material the prong embeds itself within a surface of the piece of material, thereby precluding rotation of the fastener when a threaded fastener is threaded into the threaded opening in the shaft thereof. In addition, according to some embodiments of the present invention, the thickness of the flange is sufficient such that the straight sides of two fasteners abut while in a curved portion of a guide track, thus preventing shingling.

Further scope of applicability of the present invention will become apparent from the detailed description given hereinafter. However, it should be understood that the detailed description and specific examples, while indicating some embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 shows a top view of a fastener consistent with some embodiments of the present invention;

FIG. 2 shows a side view of the fastener with two prongs taken from a direction of arrow 1 in FIG. 1;

FIG. 3 shows a perspective view of the fastener consistent with some embodiments of the present invention;

FIG. 4 shows a side view thereof taken from a direction of arrow 2 in FIG. 1;

FIG. 5 shows a cross-sectional view along the line 5-5 of FIG. 1;

FIGS. 9A and 9B show perspective views of the track showing the guidance of fasteners within the track;

FIG. 10 shows a cross-section of a curved track showing the guidance of fasteners within the track from the side;

FIG. 11 shows a perspective view of a piece of material in which a fastener in accordance with the teachings of some embodiments of the present invention has been inserted through an opening thereof and then riveted;

FIG. 12 shows a cross-sectional view of the material along the line 12-12 of FIG. 11 showing the fastener from the side;

FIG. 13 shows a perspective view of a piece of material in which the fastener is riveted below the surface; and FIG. 14 shows a cross-sectional view along the line 14-14 of FIG. 13 showing a fastener from the side.

DETAILED DESCRIPTION

Figure 7:
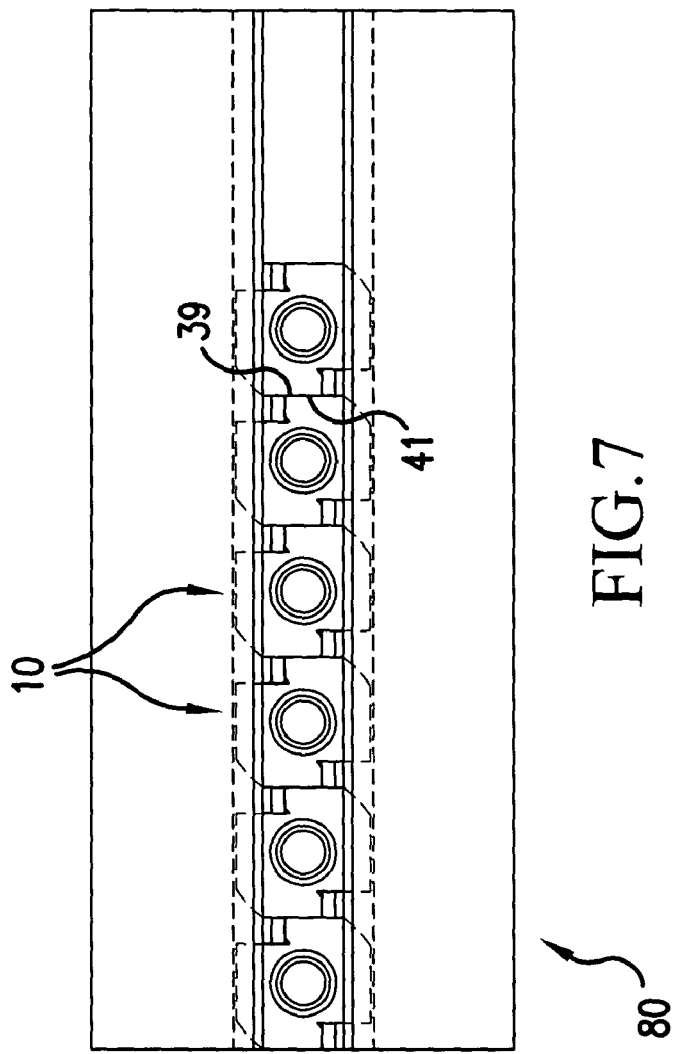
FIG. 7 shows a perspective view of multiple fasteners guided in a guide track with the direction of motion of fasteners perpendicular to the axes of elongation of the shafts thereof.
Figure 6:
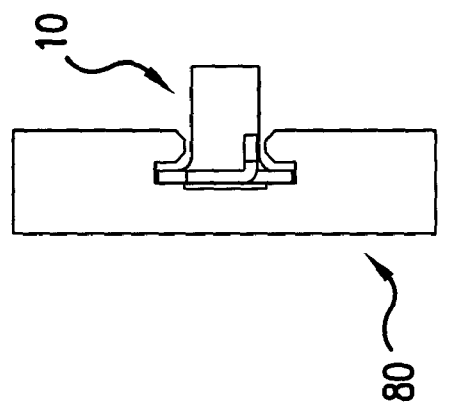
FIG. 6 shows a perspective view of a fastener guided in a guide track.
Figure 8:
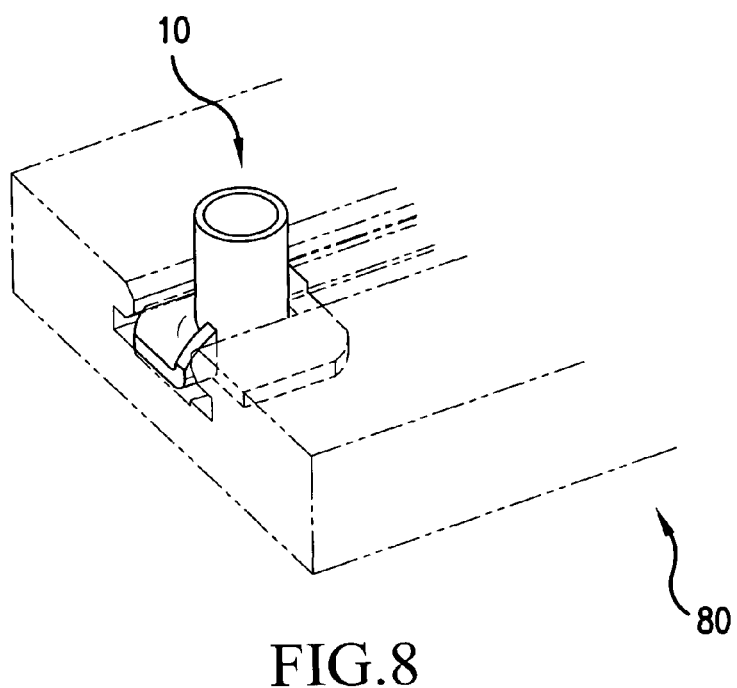
FIG. 8 shows an end view of the track showing the guidance of the fasteners within the track.

With reference to FIGS. 1-5, the inventive fastener is generally designated by the reference numeral 10 and is seen to include a flange 11 and a shaft 13 extending therefrom. The shaft 13 has an axis of elongation 15 (FIG. 4) that is perpendicular to the bottom surface 17 of the flange 11.

The flange 11 also has a top surface 19 (FIG. 1) extending upwardly therefrom.

As best seen in FIGS. 1 and 2, the flange 11 has a periphery 37 including one pair of flat side walls 39 and 41 opposed from one another about the periphery of the flange 11, a second pair of opposed flat side walls 43 and 45, and arcuate side walls 47, 49, 51 and 53. In one embodiment, each of the four flat side walls and the four arcuate walls is generally perpendicular to the top surface 19 of the flange 11.

Two prongs P1, P2 may be formed by making cuts C1, C2 in opposing straight sides 39, 41 adjacent to the diagonally opposing arcuate corners 47, 51, and then bending at points B1, B2 peripheral portions of the flange including the arcuate corners 47, 51 adjacent to the cuts C1, C2 in a direction upwardly by substantially 90°. Cuts C1, C2 may be substantially perpendicular to straight sides 39, 41. The depth of the cuts C1, C2 is such that when bends B1, B2 are made at the depth of the cuts, the perpendicular distance d2 (FIG. 1) between front surfaces S1, S2 of the two prongs P1, P2 is less than an outer diameter d1 (FIG. 4) of the shaft 13.

Further, a perpendicular distance d3 (FIG. 1) between the first and second cuts C1, C2 is greater than an outer diameter d1 (FIG. 4) of the shaft 13. In addition, a perpendicular distance d4 (FIGS. 1 and 4) between opposite straight sides of the flange 11 is greater than 1.5 times an outer diameter d1 (FIG. 4) of the shaft 13. Still further, as can be seen in FIG. 4, the thickness d5 of the flange 11 (i.e., the height of the straight sides) is at least 8% of the perpendicular distance d4 between opposite straight sides 39, 41.

As can be seen in FIGS. 1 and 2, outer edges of each of the prongs P1, P2 include the respective arcuate sides 47, 51 and gaps G1, G2 exist between an inner edge E1, E2 of the prongs P1, P2 and shaft 13. In addition, a length of an inner edge E1 of the prong P1 formed by the first straight cut C1 is longer than a length of arcuate side 47, so that an outer edge E3 of prong P1 includes the arcuate side 47 and a portion of the straight side 45 adjacent to arcuate side 47. Prong P2, which is similar to prong P1, includes outer edge E4.

Alternatively, the fasteners illustrated in FIGS. 1-5 may be made in various sizes. Exemplary fastener dimensions include: d1 in the range of 0.31 to 0.50 inches; d2 in the range of 0.30 to 0.52 inches; d3 in the range of 0.32 to 0.52 inches; d4 in the range of 0.50 to 0.80 inches; and d5 in the range of 0.06 to 0.08 inches. Fasteners may be formed with other dimensions and these are to be considered within the scope of this invention.

With reference to FIGS. 2-5, the shaft 13 has an outer wall including a generally cylindrical portion 55 and an end 57 distal from the flange 11. While the reference numeral 55 has been used to describe what is called a "cylindrical shape", alternatively, a slight taper inward may be provided in the direction from the flange 11 in the distal direction therefrom to facilitate removal of the fastener 10 from the die during the course of manufacture. As explained above, the shaft may have a non-cylindrical outer shape.

With reference to FIG. 5, the shaft 13 includes an internal passageway aligned with the axis 15 including a passageway portion 59 having a smaller diameter than the passageway portion 61. The passageway portion 61 has a wall 63 that is thinner than the wall 65. The passageway portion 59 includes female threads 67 extending from the reference numeral 69 to the reference numeral 71 in FIG. 5. A frusto-conical surface 73 is provided as a transition from the bottom surface 17 of the flange to the threaded portion 67. A further frusto-conical transition surface 75, seen in FIG. 5, provides a transition from the threaded portion 67 to the unthreaded passageway portion 61.

Figure 9A:
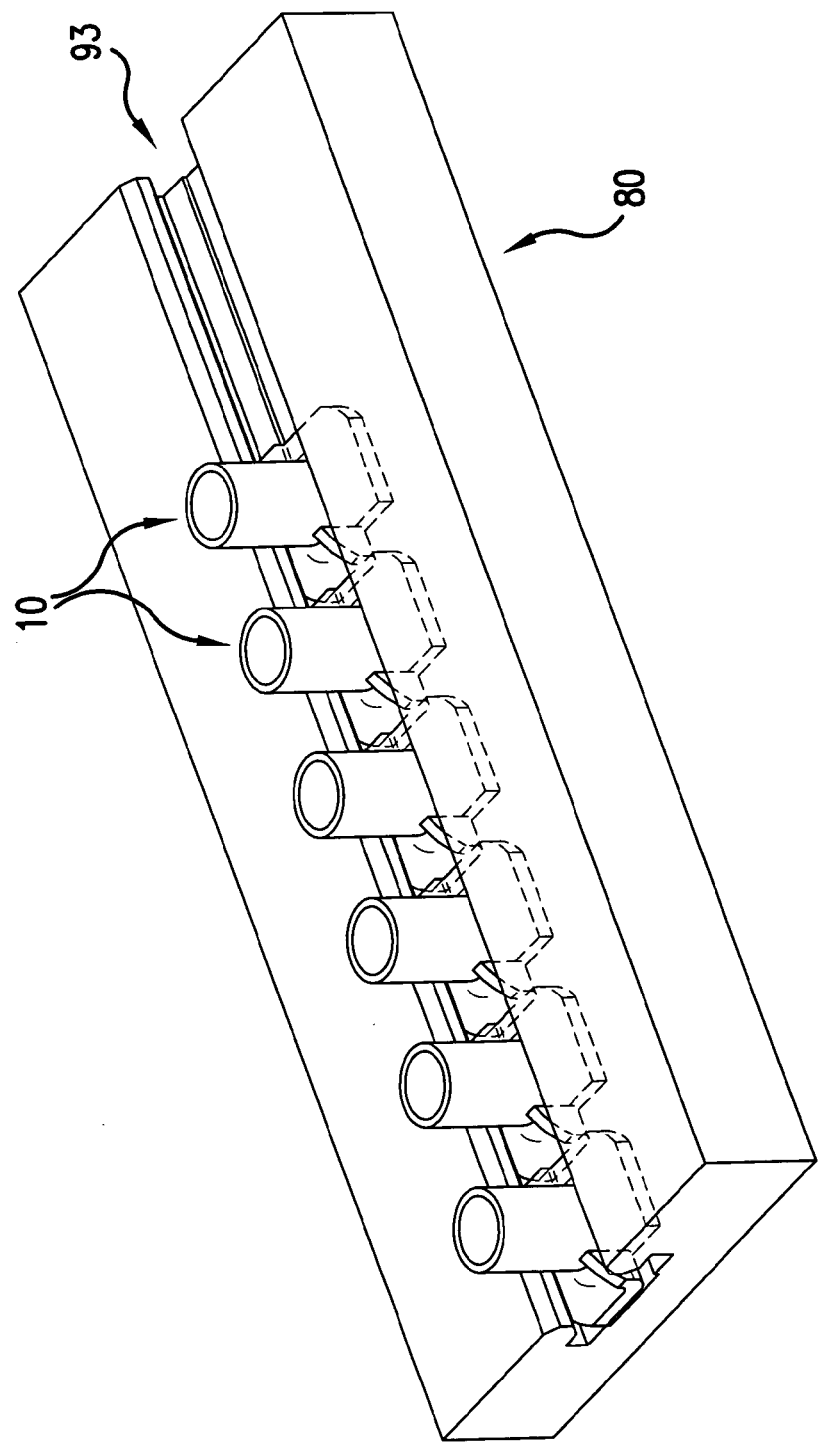

With reference now to FIGS. 6-10, a track is generally designated by the reference numeral 80 and is seen to include a bottom wall 81 and side walls 83 and 85 (FIG. 9B). The track 80 defines an inner chamber including a bottom surface 87, side surfaces 89 and 91, and a slot 93 which is defined by inner facing walls 95 and 97. Between the wall 95 and the wall 89, a horizontal wall 98 is provided. Similarly, between the walls 97 and 91, a horizontal wall 99 is provided. The walls 89 and 91 are vertically disposed and are of equal length, the length being greater than the height of the flange 11. This discrepancy is provided because, as best seen in FIG. 10, often the track may be curved. (FIG. 10 shows a cross section of the curved track with a full side view of the fastener.) Were the height of the walls 89 and 91 to closely approximate the height of the flange 11, at curved portions such as shown in FIG. 10, the fasteners could easily jam within the track. FIG. 10 also illustrates the side walls of adjacent fastener flanges riding up on the side walls of abutting flanges. As should be understood, particularly from FIG. 10 the thickness of the straight side walls of the flange prevents any overlap of the flanges that would be best described as shingling and would cause jamming of the track 80.

As best seen in FIGS. 7, 9A, 9B, and 10, when fasteners 10 are being conveyed in the feed track 80, abutting straight side walls of the respective flanges of the adjacent fasteners 10 engage one another, for example, straight side 39 on one fastener and straight side 41 on an adjacent fastener, to prevent shingling. Since the flange 11 may be generally square, it may be inserted into the track 80 at any one of two rotative positions about the axis 15. Specifically, as can be seen, a fastener 10 with two prongs, for example, may be inserted into the track 80 at only two rotative positions about the axis 15 of the fastener.

As should be understood from comparison of FIG. 5 and FIGS. 7, 9, and 10, the direction of travel of the fasteners 10 in the feed track 80 is perpendicular to the axes of elongation 15 of the shafts thereof.

In some embodiments of the present invention, the inventive fastener 10 is manufactured in a forging process with all aspects of the fastener 10 save for the female threads being formed during the course of the forging process. After an unthreaded fastener blank has been so formed, it is conveyed to a tapping machine where it is tapped as shown in FIGS. 1, 2, and 5. The track 80 shown in FIGS. 7-10 may be employed to convey fastener blanks from a vibratory feeder bowl to a tapper where the fastener blanks are tapped. The same track configuration may be used to convey fastener blanks from a vibratory feeder bowl to a location where the fasteners are inserted through openings in pieces of material and subsequently riveted into fixed position. Fasteners 10 including the prongs may also be made by a cold heading process, involving either a single operation to form flange with the prongs, or a two-step operation forming the flange in a first step, and the prongs in a second step.

Reference is now made to FIGS. 11 and 12, which depict one manner of use of the inventive fastener 10. A piece of material 1 has a passageway 2 therethrough. The fastener 10 has been inserted through the passageway 2 with the prongs of the flange 11 embedded into the bottom surface 4 of the piece of material 1 to prevent the fastener 10 from rotating. The end 63 of the shaft 13 has been riveted or flared to overlie the surface 3 of the piece of material 1.

With reference to FIGS. 13 and 14, a piece of material 5 has a passageway 6 therethrough. The piece of material 5 has a top surface 7 and a bottom surface 8. The prongs of the flange 11 are embedded into the surface 8 to preclude the fastener 10 from rotating. The fastener is inserted into the passageway 6 and the end 63 of the shaft 13 is widened or flared within the passageway 6 to lock the fastener 10 in place so that it cannot be backed out of the passageway 6.

As can be seen in FIG. 9B, since distance $d_2$ between the front surfaces of the first and the second prongs is equal to or less than an outer diameter $d_1$ of the shaft 13, the straight sides of the fastener 10 are used to align the fastener in the guide track 80. Further, since the thickness $d_5$ of the flange is equal to at least 8% of a perpendicular distance $d_4$ between opposite straight sides of the flange 11, shingling can be prevented, for example in the curved feed.

Of course, various changes, modifications and alterations in the teachings of the present invention may be contemplated by those skilled in the art without departing from the intended spirit and scope thereof.

For example, the elongated shaft, may if desired, take on a non-cylindrical shape, such as square or triangular cross-sectional shape, or a shape in which the diameter of the shaft varies along its length. At the end of the shaft distal from the flange, an inwardly tapered end may be provided to best facilitate insertion of that end of the shaft within an opening in a piece of material. During the course of manufacture, such a slight taper in a direction inward from the flange also permits the shaft to be easily be removed from the die that is used to manufacture it. For example, if the fastener is manufactured by stamping, the shaft may have a slight taper, whereas in the cold heading fabrication process generally there may be no taper.

The shaft may have two adjacent regions including a first region adjacent the flange having relatively thicker walls and an opening therethrough tapped with female threads. A second region distal from the flange may have thinner walls and may be unthreaded. If desired, a transition region may be provided between the first and second regions, which comprise a generally frusto-conical surface diverging outwardly in the direction toward the distal end of the shaft. Of course, if desired, the wall thickness of the shaft may be made uniform substantially throughout its length.

Where the passageway through the inventive fastener intersects with the bottom surface of the flange, the passageway may taper inwardly in a direction from the bottom surface of the flange toward the distal end of the shaft. This taper allows easy guidance of adjacent fasteners in a track in an embodiment where the track is configured to guide the fasteners with the axes of elongation of the shafts thereof aligned with the direction of movement through the track. Of course, the passageway may be opened only at the distal end of the shaft, and be closed at the flange end of the fastener.

In the embodiment shown in the figures, the dimension $d_2$ is less that of $d_1$, so that the prongs play no role in guiding the fastener in the feed track, the fastener instead being guided by the straight sides of the flanges. However, dimension $d_2$ may be equal to or somewhat greater than $d_1$, provided the slot in the feed track will accommodate this larger dimension.

Further, while the embodiment of the fastener described above and shown in the figures includes two prongs diagonally opposed to each other, alternative configurations are possible. For example, the fastener may have two prongs each cut from the same side of the flange. Other fastener configurations are possible, including fasteners with one prong, three prongs, or four prongs. Obviously, the dimension $d_2$ is not applicable to a fastener having one prong or to a fastener having two prongs cut from the same side of the flange. Further, it will be obvious that with fasteners having only one prong, or two prongs that are not adjacent to each other on the same side, it is the straight sides of the flange, not the prong(s), that provide guidance in the track.

The number of prongs may be determined, among other factors, by the characteristics of material into which the fasteners are to be inserted. For example, fasteners are sometimes inserted into material that is very hard and somewhat brittle. In some plastics for instance, the prongs can generate splitting. Reducing the number of prongs should reduce splitting—hence the benefit of having just one or two prongs. Fewer prongs will also reduce the force required to insert the fastener, which with hard material is quite large and can require modifications to the installation machine in order to increase the power. Also, the shape of the prongs may be varied, with narrower prongs being more suited for brittle material. Still further, cuts C1 and C2 need not be straight or substantially perpendicular to the straight sides. Cuts C1 and C2 may also be curved with various curve shapes and orientations with respect to the straight sides. A cut of could also include two straight segments. By making the cuts curved would create a hooked-type prong that could clinch the material of the workpiece. A prong with a sharper point that could penetrate the workpiece surface more easily.

Also, the corner walls may be truncated with straight sides, rather than being arcuate side walls. Further, the flange may be rectangular rather than square. In the case of a rectangular flange, the flanges would generally be fed into the guide track with the long dimension aligned with the axis of the feed track.

In addition, the corner walls may connect with adjacent straight sides at different angles, for example angles in a range of 135° to 155°. Thus, regardless of whether the corner walls of the flange are straight truncated sides or arcuate sides, the inner edges (E1, E2) and outer edges (E3, E4) of the prongs P1, P2 may meet at angles in a range of 25° to 45°. Further, the corner walls may be provided with one or more serration, or notches for fixing the fastener to a material, such as wood, more securely.

Further, the threaded portion of the shaft may be distorted, in order to more tightly grip a screw in the shaft. In addition, the shaft of the fastener may be hollow from one end to the other, or alternatively, the shaft may be open at the end distal from the flange and closed and the flange end.

Still further, the distal end of the shaft may either be riveted or not riveted. In many situations, riveting may not be needed, since the prongs digging into the material (e.g., wood) are sufficient to prevent rotation of the fastener when a screw is turned into the fastener. Avoiding riveting greatly simplifies the process of installing the fasteners in those materials in which the prongs alone are sufficient to fix the fastener to the material and to prevent rotation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fastener comprising:
   a plate-shaped flange having top and bottom surfaces, and a first prong extending in a direction that is substantially perpendicular to the surfaces of the plate-shaped flange; and
   a shaft, said shaft extending upwardly from the top surface of said plate-shaped flange, and including an opening aligned with said shaft, the opening being remote from said flange,
   said plate-shaped flange including
      a periphery including four straight sides, the four straight sides being a first straight side, a second straight side, a third straight side and a fourth straight side, the first and the third straight sides being parallel to each other, the first and third straight sides being orthogonal to the second and fourth straight sides, and
      a first straight edge (C1) extending in a direction substantially perpendicular to the first straight side;
      a first arcuate side connecting the first straight side and the second straight side; and
      a third arcuate side connecting the third straight side and the fourth straight side;
   wherein the first prong is adjacent to the first straight edge (C1), and includes a straight inner edge (E1) that is perpendicular to the first straight side of the flange, and an outer edge (E3) including a fourth arcuate side.

2. The fastener of claim 1, further comprising:
   a second prong extending in a direction that is substantially perpendicular to the surfaces of the plate-shaped flange,
   a second straight edge (C2) extending direction substantially perpendicular to the third straight side; and
   wherein the second prong includes a straight inner edge (E2) that is perpendicular to the third straight side of the flange, and an outer edge (E4) that includes a second arcuate side, and
   wherein when the fastener is viewed in elevation view from either of the first straight side or the third straight side, a gap (G2) can be seen between the inner straight edge (E2) of the second prong and an outer side of the shaft, and
   wherein when the fastener is viewed in elevation view from either of the second straight side or the fourth straight side, the second prong is completely overlapped by the shaft.

3. The fastener of claim 2, wherein a perpendicular distance (d2) between the front surfaces (S1, S2) of the first and the second prongs is equal to or less than an outer diameter (d1) of the shaft.

4. The fastener of claim 2, wherein a perpendicular distance between the first and second straight inner edges (E1, E2) of the prongs is greater than an outer diameter (d1) of the shaft.

5. The fastener of claim 1, wherein a perpendicular distance (d4) between opposite straight sides of the flange is greater than 1.5 times an outer diameter (d1) of the shaft.

6. The fastener of claim 1, wherein, in order to prevent shingling of abutting fasteners, a thickness (d5) of the flange is equal to at least 8% of a perpendicular distance (d4) between opposite straight sides of the flange.

7. The fastener of claim 1, wherein the shaft of the fastener is adapted to fit in a hole in another substance, and the first prong is adapted to penetrate into the another substance, thereby securing the fastener to the another substance.

8. The fastener of claim 1, wherein said shaft has an axis of elongation perpendicular to the top surface of said flange.

9. The fastener of claim 1, further comprising a second opening aligned with said shaft, the second opening being adjacent to said flange.

10. The fastener of claim 1, wherein at least a portion of the opening is provided with screw threads.

11. The fastener of claim of claim 10, wherein the screw threads are distorted.

12. The fastener of claim 1, wherein an angle between a tangent to the inner edge (E1) and a tangent to the outer edge (E3) of the first prong (P1) at a point where the inner edge (E1) and the outer edge (E3) meet is in a range of 25° to 45°.

13. The fastener of claim 1, wherein the shaft is hollow.

14. The fastener of claim 1, wherein a radius of curvature of the first arcuate side is greater than a distance from a center of the flange to the first arcuate side.

15. The fastener of claim 1, wherein the arcuate sides are portions of circles having different center points.

16. The fastener of claim 1, wherein each of the four straight sides has a length (d3) equal to at least 50% of a distance (d4) between the first and third straight sides of the flange, thus providing long straight contact surfaces when a plurality of flanges abut against each other.

17. The fastener of claim 1, wherein the flange has a substantially square periphery.

18. The fastener of claim 1, wherein when the fastener is disposed in a slot of a feed track, the first and third straight sides of the fastener are adapted to guide the fastener between a pair of side walls which face each other in the slot of the feed track.

19. The fastener of claim 1, wherein a length of the inner edge (E1) of the first prong is longer than a length of the fourth arcuate side of the outer edge (E3) of the first prong.

20. The fastener of claim 1, wherein when the fastener is viewed in elevation view from either of the first straight side or the third straight side, a gap (G1) can be seen between the inner straight edge (E1) of the first prong and one outer side of the shaft, and
   when the fastener is viewed in elevation view from the second straight side, the first prong is completely overlapped by the shaft.

21. A fastener comprising:
   a shaft; and
   a plate-shaped flange having a first prong (P1) and a second prong (P2) disposed on opposite sides of the shaft, each of the first prong (P1) and the second prong (P2) extending in a direction that is substantially perpendicular to a top surface of the plate-shaped flange; and
   said shaft extending upwardly from the top surface of said plate-shaped flange, and including an opening aligned with said shaft, the opening being remote from said flange,
   said flange having
      a periphery including four straight sides, the four straight sides being a first straight side, a second straight side, a third straight side and a fourth straight side, the first and the third straight sides being parallel to each other, the first and third straight sides being orthogonal to the second and fourth straight sides, and
      a first straight edge (C1) extending in a direction substantially perpendicular to the first straight side,
      first and third corner walls, connected respectively to at least one end of an adjacent one of the four straight sides;
   wherein the first prong (P1) is adjacent to the first straight edge (C1), and includes a straight inner edge (E1) that is perpendicular to the first straight side of the flange, and an outer edge (E3) the first prong (P1) being the only prong adjacent to the first straight edge (C1), wherein there is a perpendicular distance (d2) between front surfaces of the first prong (P1) and the second prong (P2) which is equal to or less than an outer diameter (d1) of the shaft, wherein the perpendicular distance is measured in a direction parallel to the first straight cut (C1).

22. The fastener of claim 21, wherein an angle between a tangent to the first corner wall and a tangent to the corresponding straight side at a point where the first corner wall and the corresponding straight side meet is in the range of 135° to 155°.

23. The fastener of claim 21, further comprising:

surfaces of the plate-shaped flange;

a second straight edge (C2) extending in a direction substantially perpendicular to wherein the second prong (P2) includes a straight inner edge (E2) that is perpendicular to the third straight side of the flange, and an outer edge (E4), and wherein when the fastener is viewed in elevation view from either of the first straight side or the third straight side, a gap (G2) can be seen between the inner straight edge (E2) of the second prong (P2) and an outer side of the shaft, and wherein when the fastener is viewed in elevation view from either of the second straight side or the fourth straight side, the second prong (P2) is completely overlapped by the shaft.

24. The fastener of claim 21, wherein each of the four straight sides has a length (d3) equal to at least 50% of a width of the flange, thus providing long straight contact surfaces when a plurality of flanges abut against each other.

25. The fastener of claim 21, wherein, in order to prevent shingling of abutting fasteners, a thickness (d5) of the flange is equal to at least 8% of a perpendicular distance (d4) between opposite straight sides of the flange.

26. The fastener of claim 21, wherein when the fastener is disposed in a slot of a feed track, the first and third straight sides of the fastener are adapted to guide the fastener between a pair of side walls which face each other in the slot of the feed track.

27. The fastener of claim 21, wherein a length of the inner edge (E1) of the first prong (P1) is longer than a length of the outer edge (E3) of the first prong (P1).

28. The fastener of claim 21, wherein when the fastener is viewed in elevation view from either of the first straight side or the third straight side, a gap (G1) can be seen between the inner straight edge (E1) of the first prong (P1) and one outer side of the shaft, and when the fastener is viewed in elevation view from the second straight side, the first prong (P1) is completely overlapped by the shaft.

* * * * *